(12) United States Patent
Ho et al.

(10) Patent No.: US 7,074,125 B2
(45) Date of Patent: Jul. 11, 2006

(54) COMBINE TAILINGS SENSOR SYSTEM

(75) Inventors: Yun Ren Ho, Naperville, IL (US); Quentin Guhr, East Moline, IL (US); Douglas Wolken, Shorewood, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/131,096

(22) Filed: May 17, 2005

(65) Prior Publication Data

US 2005/0208987 A1 Sep. 22, 2005

Related U.S. Application Data

(63) Continuation of application No. 10/784,762, filed on Feb. 23, 2004.

(51) Int. Cl.
*A01D 75/18* (2006.01)
*A01F 12/16* (2006.01)
*A01F 21/00* (2006.01)

(52) U.S. Cl. ........................................... 460/6

(58) Field of Classification Search ................... 460/1, 460/4, 5, 114; 56/10.2 R, 10.2 C
See application file for complete search history.

(56) References Cited

U.S. PATENT DOCUMENTS

| 4,441,513 | A  | * | 4/1984  | Herwig ............................ 460/1 |
| 6,053,811 | A  | * | 4/2000  | Johnson et al. .................. 460/6 |
| 6,941,736 | B1 | * | 9/2005  | Freeman ..................... 56/10.2 C |
| 2003/0066277 | A1 | * | 4/2003  | Behnke ..................... 56/10.2 R |
| 2003/0216158 | A1 | * | 11/2003 | Bischoff ........................ 460/6 |

* cited by examiner

*Primary Examiner*—Árpád Fábián Kovács
(74) *Attorney, Agent, or Firm*—Michael G. Harms; John William Stader; Stephen A. Bucchianeri

(57) ABSTRACT

A system for sensing the presence of tailings in a combine includes a tailings sensor configured to generate a signal indicative of a flow rate of tailings and a first microcontroller module coupled to the tailings sensor and configured to receive the signal and filter it by removing transient high excursion noise. The signal may be low-pass filtered and notch filtered to remove other components of noise.

6 Claims, 6 Drawing Sheets

US 7,074,125 B2

COMBINE TAILINGS SENSOR SYSTEM

CROSS REFERENCE AND INCORPORATION OF RELATED APPLICATIONS

The present patent application is a Continuation of, and claims priority (35 U.S.C. 120) to, co-pending application Ser. No. 10/784,762, filed Feb. 23, 2004, and which is hereby incorporated herein by reference.

FIELD OF THE INVENTION

The present invention generally relates to agricultural combines or harvesters and, more particularly, to an apparatus for monitoring combine tailings.

BACKGROUND OF THE INVENTION

As an agricultural combine moves across a field, it cuts standing crop and feeds the severed crop materials to a threshing section of the combine. The threshing section of a rotary combine typically includes a threshing cylinder rotatably mounted within a foraminous housing. As the threshing cylinder rotates, the crop materials gently spiral rearwardly and grain is separated from the remainder of the crop materials. Material passing from the threshing cylinder gravitationally passes to a cleaning section of the combine for further processing.

The cleaning section of a rotary combine typically includes a pair of vertically spaced sieves. The sieves are horizontally oscillated causing clean grain to fall therethrough for collection. Normally, at least one of the sieves on the combine includes a plurality of "fingers" that are adjustable relative to each other such that the combine can operate in crop materials having different grains. A blower or fan directs air upwardly and across the sieves to further separate material other than grain from the materials passing from the threshing section.

As will be appreciated, heavier grain material falls through the sieves, is collected, and conveyed to a clean grain bin on the combine. Incompletely threshed grain, however, will not normally pass through the sieves and yet is too heavy to be blown out the rear of the combine with the chaff. These materials, which include grain, are commonly referred to as "tailings". As an example, "tailings" include a fluffy or extremely light weight mixture of grain and mature vegetation on which the grain grows. In the case of wheat, barley and similar crop, tailings include the grain which remains attached to the fragments of the heads, while in the case of corn, tailings include kernels, which remain attached to a piece of cob. To enhance the effectiveness of the combine, the tailings are recycled by returning them to the threshing section for rethreshing as through use of a tailings elevator.

The volume or amount of tailings being recycled depends on the efficiency of the threshing and cleaning sections of the combine. Efficiency of the threshing and cleaning sections is determined by such factors as the clearances provided between the threshing cylinder and housing, threshing speed, the adjustment of the sieves, the output of the cleaning fan, and the volume of crop material input into the combine. If the volume or amount of tailings presented for return is excessive, the combine will tend to "plug up" with grain. That is, as the machine becomes full, the drive system used to transfer rotary power between components begins to slip thus presenting significant operating problems for the operator. When the combine does plug up, however, the operator needs to spend valuable harvesting time returning it to proper operating order. Besides the significant loss of valuable harvesting time, when a combine plugs up serious and costly damage can occur to the combine.

To solve the problem of excessive tailings, the operator can reduce ground speed of the combine, thus presenting less crop material for threshing. As will be appreciated, this is not a feasible solution to the problem because slowing the speed of the combine likewise means less efficiency. Alternatively, the operator can adjust the sieves to reduce the volume of tailings. Sieve adjustment, however, is a subjective process for the operator. That is, the operator can not be sure whether the adjustment chosen is correct before the machine is again plugged up. Alternatively, if the adjustment is incorrect, and although the tailings volume may be reduced, there may be significant contamination of the clean grain as a result of the sieves being incorrectly adjusted. Moreover, adjustment of the sieves is a time consuming process which may or may not be required depending upon several factors including the dryness of the crop material.

To solve this problem, a system of monitoring and displaying the quantity of tailings was disclosed in U.S. Pat. No. 6,053,811. In this system, a sensing device located near the tailings auger at the rear of the combine generated a signal indicative of the quantity of tailings that were created. An electronic display showed the quantity of tailings on a display for the operator to monitor.

The tailings sensing device was susceptible to vibration and other sources of electrical signal noise, however, making it difficult to provide a steady reading indicating the actual tailings volume.

What is needed is an improved system of measuring the quantity of tailings that is less susceptible to vibration, uneven tailings flow and other noise sources than previous sensing devices.

SUMMARY OF THE INVENTION

In view of the above, and in accordance with a first aspect of the invention, there is provided a system for sensing the presence of tailings in a combine, including a sensor configured to generate a signal indicative of a flow rate of tailings, and a first electronic module coupled to the sensor for removing transient high excursion noise from the signal, for example by clipping transient excursion noise.

The sensor may be configured to be disposed adjacent a laterally-extending tailings auger between adjacent sidewalls of a combine.

The system may further include a second microcontroller module configured to receive the filtered signal and display it.

The first module may be configured to notch filter the signal at a natural frequency of the tailings auger and clip positive-going sensor signal excursions.

The first module may be configured to low-pass filter the clipped sensor signal.

The second module may be configured to display the low-pass filtered signal.

The first module may be configured to digitally identify local minima of successive sensor signal samples.

The noise may be removed in a first phase of noise removal by passing the sensor signal through a band-stop filter (or notch filter) to filter out noise components of the signal that are generated by the auger at the auger's rotational frequency.

Additional noise may be removed in a second phase of noise removal by determining when the first phase signal changes states from being near a local minimum value, to a magnitude away from a local minimum value. The system may deem significant excursions away from the local minimum to be noise and removes these noise excursions away from the local minimum from the first phase signal.

Even more noise may be removed in a third phase of noise removal by low-pass filtering the second phase signal to smooth the output and provide a more gradual signal transition.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PRESENT INVENTION

Figure 1:
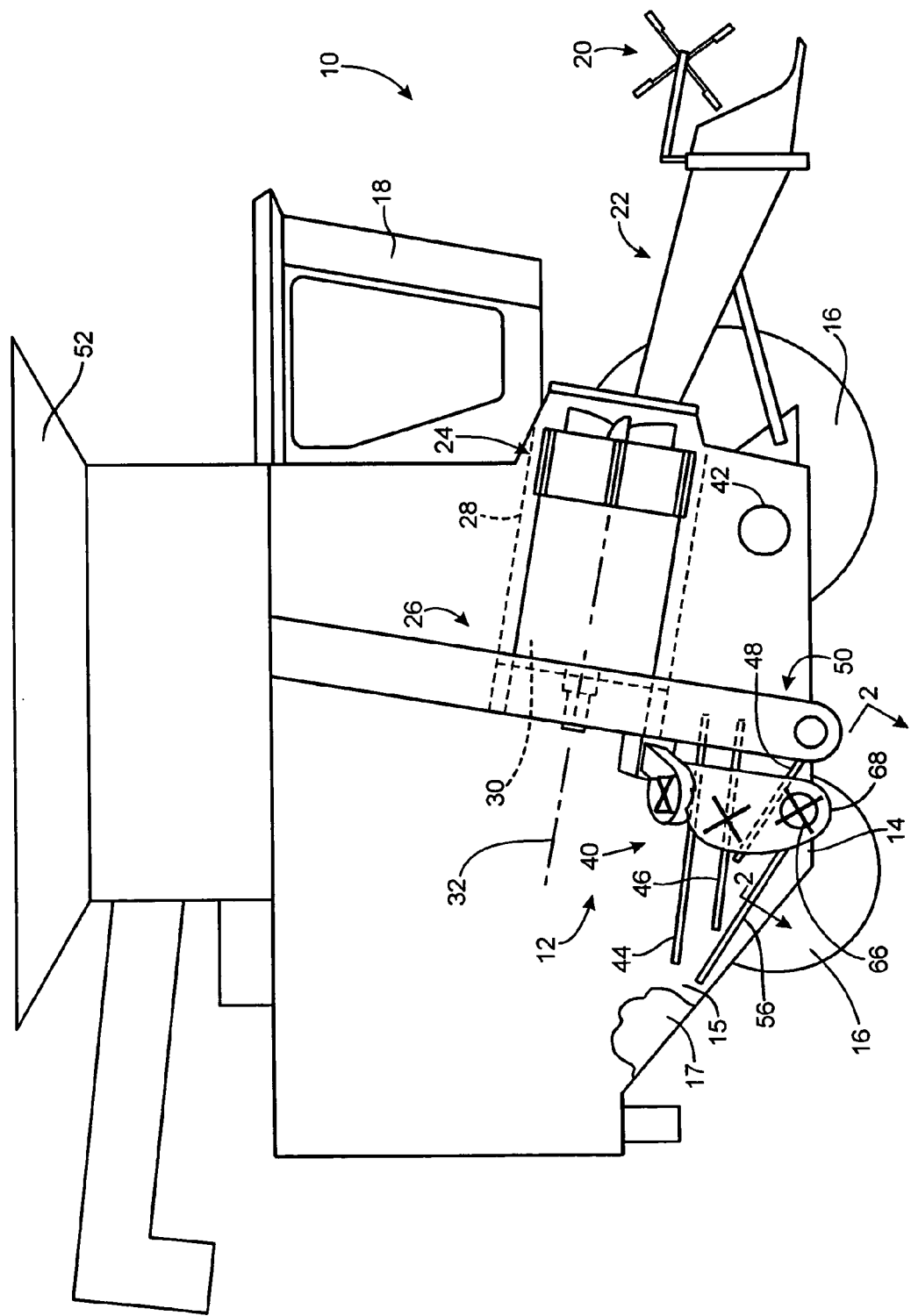
FIG. 1 is fragmentary side elevational view of an agricultural combine embodying principles of the present invention.

While the present invention is susceptible to being embodied in various forms, there is shown in the drawings a presently preferred embodiment hereinafter described. It should be understood that the present disclosure is to be considered as but one example of the invention, provided in sufficient detail for those skilled in the art of agricultural combine manufacture to construct. It is not intended to limit the invention to the specific embodiment illustrated.

Referring now to the drawings, wherein like reference numerals refer to like parts throughout the several views, there is shown in FIG. 1 a self-propelled agricultural harvester or combine 10. The combine 10 is preferably of the type marketed by the assignee as its AFX-8010 combine but it should be appreciated that the teachings of the present invention are equally applicable to other forms of agricultural harvesters without departing or detracting from the spirit and scope of the present invention. Combine 10 includes a body or housing 12 carried on a frame or a chassis 14 which is supported for movement across a field by wheels 16. The housing 12 includes parallel side walls 15 and 17 defining an enclosure therebetween. As is conventional, the combine is powered by an engine (not shown) and controlled from an enclosed operator station 18 arranged toward a forward end of the chassis or frame 14.

A crop harvesting apparatus or header 20 and an infeed mechanism 22 are arranged toward a forward end of the combine beneath the cab enclosure 18. As is well known, the harvesting apparatus or header 20 cuts and harvests the crop materials and feeds the severed crop materials to the infeed mechanism 22 as the combine is driven across a field. The infeed mechanism 22 receives crop materials from the header assembly 20 and directs them rearwardly to a threshing section 24 on the combine 10.

In the illustrated form of the invention, the threshing section 24 is mounted within the housing 12 between the walls 15 and 17 and includes a rotor assembly 26. The rotor assembly 26 is preferably configured as a single unit that threshes and separates the crop materials presented thereto into grain and material other than grain. As schematically represented in FIG. 1, the rotor assembly 26 comprises an elongated and generally cylindrical member 28 in the form of a rotor casing or cage having a rotor 30 mounted for rotation therein and about a fixed axis 32. Between the upstream and downstream ends of the rotor assembly 26, crop material is threshed repeatedly, but gently, as it spirals around the single large diameter rotor 30 and grain is permitted to pass through the foraminous threshing cage 28. In a conventional manner, suitable instrumentalities mounted on the periphery of the rotor 30 cooperate respectively with the rotor casing or cage 28 to thresh the crop materials such that most of the grain will be separated and propelled downwardly through the housing.

Threshed materials passing outwardly from the rotor assembly 26 gravitationally move and are received at a cleaning section 40 also arranged within the body or housing 12 of combine 10. The purpose of the cleaning section 40 is to remove chaff and tailings from the threshed materials received from the rotor assembly 26.

The cleaning section 40 includes a cleaning fan 42 and preferably two cleaning sieves 44 and 46. Each sieve 44, 46 is generally rectangular in configuration and extends in a fore-and-aft direction beneath the threshing section 24 and between the side walls 15,17 of housing 12. During operation of the combine, the cleaning fan 42 directs a forceful stream of air upwardly through and across the top surface of the generally rectangular sieves 44 and 46. As the materials fall from the rotor assembly, chaff, tailings and material other than grain is blown rearwardly under the influence of the cleaning fan 42. The chaff and other light residue materials is entrained in the air stream of fan 42 and blown out the rear end of the combine.

To enhance versatility of the machine, and as is well known in the art, one of the sieves 44, 46 preferably includes a plurality of adjustable fingers (not shown) arranged in a well known and cooperative relationship relative to each other such that the permeability of the sieve is adjustable depending upon the crop being harvested. Clean grain gravitationally passes through the sieves 44, 46 and is collected in a clean grain collection area 48. A clean grain elevator 50 moves the clean grain from the area 48 to a clean grain storage bin 52 preferably mounted on the frame or chassis 14 of the harvester.

Tailings, including grain which is only partly threshed, will not pass through the sieves 44, 46. Because they are too heavy to be blown out with the chaff under the influence of the cleaning fan 42, the tailings pass from the cleaning section 40 to a tailings section 56 on the combine. The purpose of the tailings section 56 is to return tailings to one of the threshing section 24 or cleaning section 40 for rethreshing and, thus, recapturing of the grain carried with the tailings.

Figure 2:
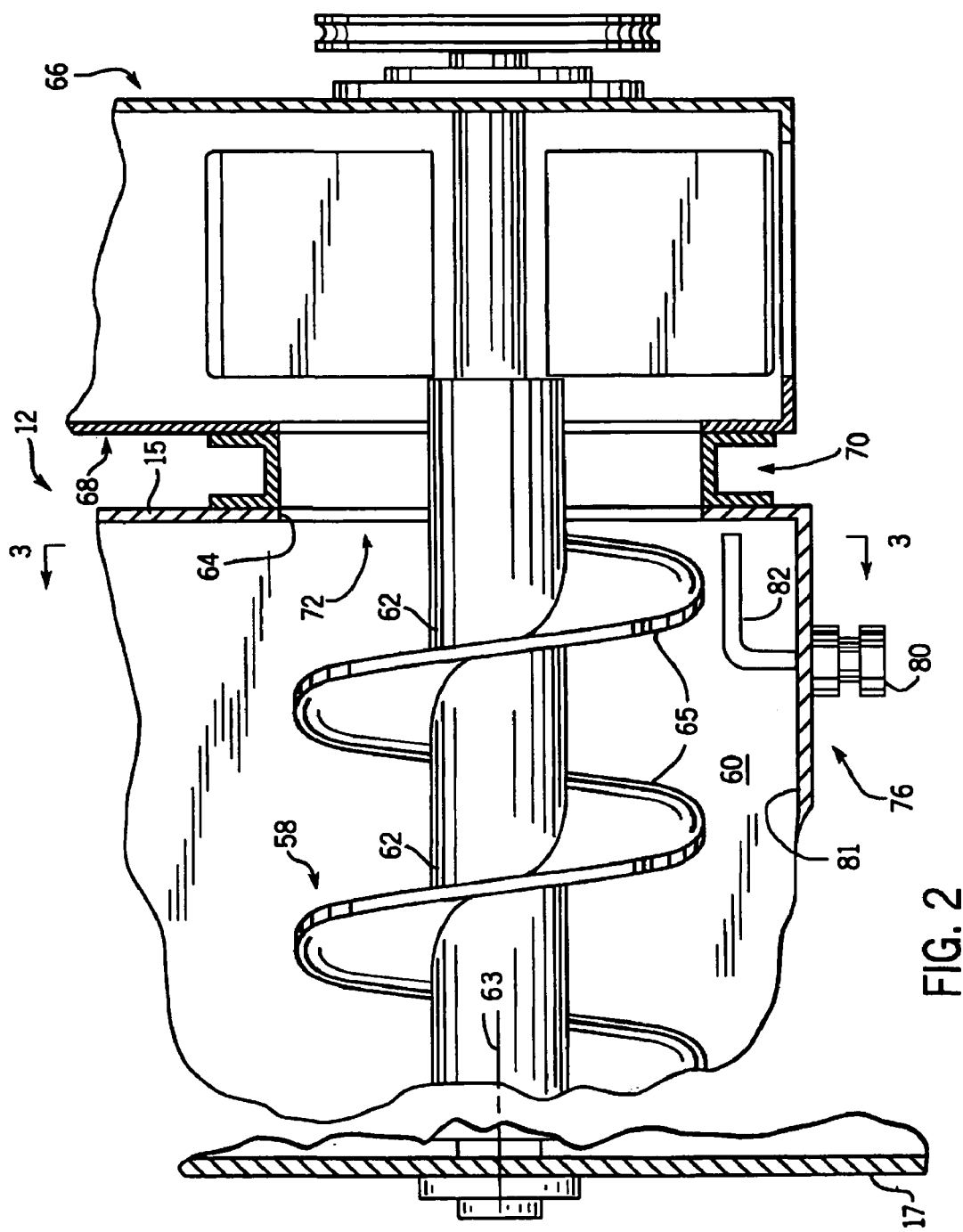
FIG. 2 is an enlarged fragmentary cross-sectional view taken along line 2—2 of FIG. 1.

As shown in FIGS. 1 and 2, the tailings section 56 of the combine is arranged in predetermined relation relative to the threshing and cleaning sections 24 and 40, respectively, and includes a tailings auger 58 arranged in combination with a tailings pan 60. In a preferred form, the tailings auger 58 includes an elongated driven auger screw 62 that rotates about an axis 63 and extends transversely across the entire width of the sieves 44 and 46 in generally parallel relation. The auger screw 62 is mounted adjacent and in operative relation with the tailings trough or pan 60 to move the tailings toward one side wall of the combine. As is well known, the auger screw 62 includes flightings 65 extending along the axial length thereof for engaging and moving the tailings in one direction generally parallel with the axis 63 of the auger screw 62 and toward the right side of housing 12.

As The tailings auger 58 axially extends beyond the housing 12 through an opening or hole 64 defined in that side wall of the housing toward which the tailings are moved under the influence of auger 58. The tailings are operatively delivered by the auger 58 to a tailings conveyor 66. As shown is FIGS. 1 and 2, the tailings conveyor 66 is mounted outside or exteriorly of housing 12 in a housing 68. The tailings conveyor includes three fans or blowers (FIG. 1).

As shown in FIG. 2 to facilitate transference of tailings material between housing 12 and conveyor 66, a tube-like coupler 70 is arranged in surrounding relation and extends axially along a lengthwise portion of the tailings auger 58. As shown, coupler 70 defines an enclosed passage 72 that opens, at one end, to wall 15 and, at the other end, to the inlet end of the tailings conveyor 66.

The tailings section 56 of combine 10 further includes a tailings volume sensor 76 for sensing the volume of tailings being conveyed for reprocessing.

The auger trough or tailings pan 60 converges into the generally round tube-like coupler 70. The convergence creates a restriction that limits the maximum capacity of the tailings conveyor 66. Testing has revealed that measuring the volume of tailings material at this location is the best way to measure the capacity of the combine to handle tailings for rethreshing purposes. The tailings sensor 76 is preferably arranged adjacent to (or in) passage 72.

As will be described in detail below, the sensor 76 of the present invention provides a visual indication of the operating efficiency of the combine 10 to the operator. The sensor 76 positively measures the volume or flow of tailings moving to the tailings conveyor 66 for rethreshing and provides an output signal proportional thereto.

Figure 3:
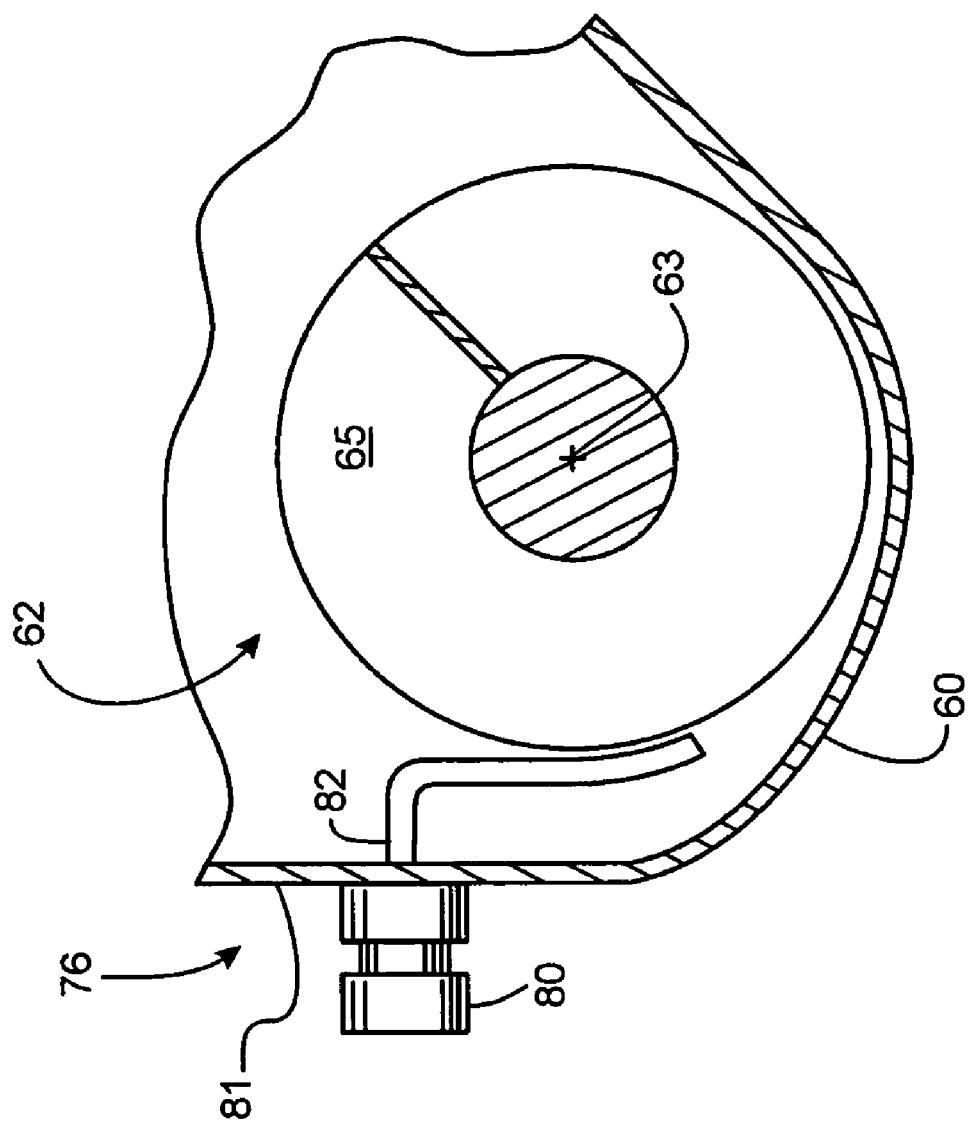
FIG. 3 is a sectional view taken along line 3—3 of FIG. 2.

As shown in FIGS. 2 and 3, the sensor 76 includes a sensing element 80 secured to the rear wall 81 and an actuator 82 operably associated with the sensing element 80 and configured to be positioned in close proximity to the periphery of flightings 65 on auger screw 62. The sensing element 80 is capable of detecting rotation of actuator 82. The preferred embodiment is a Hall Effect sensor of the type sold by Power Components of the Midwest. It may also be of a potentiometer type sold by Duncan Electronics, a division of BEI Sensors and Systems Company of Tustin, Calif. under Model No. 9810-678. Any apparatus capable of measuring the volumetric flow of tailings would be equally applicable to the present invention, such as a capacitive sensor for sensing the presence or absence of tailings, a force or strain sensor for detecting a force or load placed on components of the combine by the volume of tailings passing therethrough, a pressure sensor for sensing a pressure applied by the tailings against a structure, a sensor for sensing the amount of work performed by the tailings auger proportional to the volume of tailings moved by the auger screw 62, a hydraulic pressure sensor for sensing the hydraulic force applied to the auger, indicative of the applied load on the driving elements, an optical sensor to detect the flow of tailings, such as a light reflection or transmission sensor operative in visible, infrared, or ultraviolet ranges, or a radar sensor.

During operation of the harvester, the header 20 (FIG. 1) reaps and rearwardly advances the crop material to the threshing section 24 of the combine 10. Materials are passed outwardly from the threshing section 24 toward the cleaning section 40. As the materials fall from the threshing section 24, the air directed by the cleaning fan 42 separates the chaff from the heavier grain. Sieves 44 and 46 furthermore facilitate cleaning of the materials received from the threshing section 24. Because the tailings are heavier they are not typically blown out the rear of the machine with the chaff. Instead, the tailings are moved to the tailing section 56 whereat the tailings auger 58 moves such tailings through the hole or opening 64 in the housing 12 to the tailings conveyor 66 for reprocessing so as to recapture the grain carried therewith.

As the tailings are moved to the right by auger screw 62 of the tailings conveyor, they are pressed against actuator 82 and deflect it to the right (in FIG. 2) as well. This deflection pivots the lower end of the actuator to the right, which rotates the sensing element 80. The signal produced by the sensing element is generally proportional to the degree of deflection of the sensing element.

The force applied to the actuator 82 and thus the position of the actuator and the signal generated by the sensing element 80 are irregular. On each rotation of the auger screw 62, the auger flighting 65 sweeps past the sensor 76 applying intermittent pressure against the actuator 82 at a frequency equal to the rotational frequency of the auger screw 62—in this embodiment about 9.5 Hz. This pressure is not applied directly by the flightings 65 to the actuator 82, since they do not contact the actuator, but is applied by the tailings. When this cyclical pressure is applied to sensor 76, the actuator 82 deflects momentarily. This once-every-revolution deflection of the actuator 82 generates a noise component in the sensor signal at the frequency of rotation of the auger screw 62. When the flight passes the actuator 82, the pressure applied by the auger screw 62 drops and the actuator 82 returns to its original position. The resulting once-every-revolution oscillation of actuator 82 produces a corresponding once-every-revolution oscillation in the signal produced by sensor 76.

In addition to this cyclical noise component, there is a noise component generated by the uneven flow of tailings through the tailings auger 58. The tailings typically include clods or chunks of plant matter and earth that jostle the actuator 82 as they pass through auger 58. These chunks of matter hit the actuator 82, causing it to bounce upward away from the tailings flow, and cause the sensor 76 to generate sudden transient signal spikes that almost immediately disappear, for once the chunks hit actuator 82, they bounce off, continue through auger 58, and the actuator 82 returns to its original position, riding along on the surface of the tailings stream.

These sudden, irregular, random and transient excursions of the sensor signal due to impacts against the actuator 82 provide a second source of noise to the signal since they do not truly indicate the level of tailings in the auger, merely the erroneous movement of actuator 82 up and away from the tailings.

Figure 4:
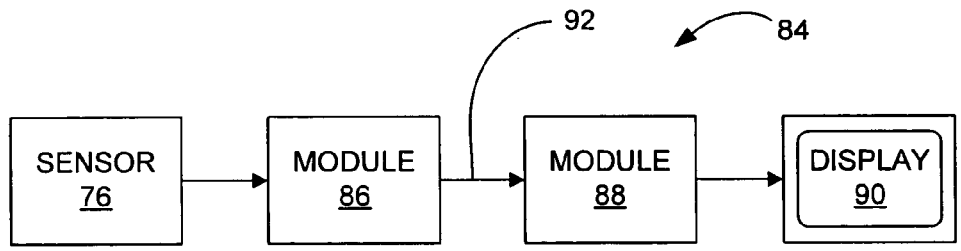
FIG. 4 is a schematic representation of the electronic circuit that monitors the tailings sensor filters the output and displays the results.

FIG. 4 illustrates the control circuit 84 that processes the signal of sensor 76. Circuit 84 includes a first microcontroller module 86 that is operatively coupled to sensor 76 to receive and process the sensor signal. A second microcontroller module 88 is cooperatively coupled to module 86 to receive the processed signal and transmit it to an electronic display 90. Electronic display 90 is operatively coupled to the second module 88 to receive the processed signal and display it to the operator. A serial communication link 92 such as an SAE J1939 CAN bus couples module 86 and 88 to transmit the processed signal as a series of digital packets.

Figure 5:
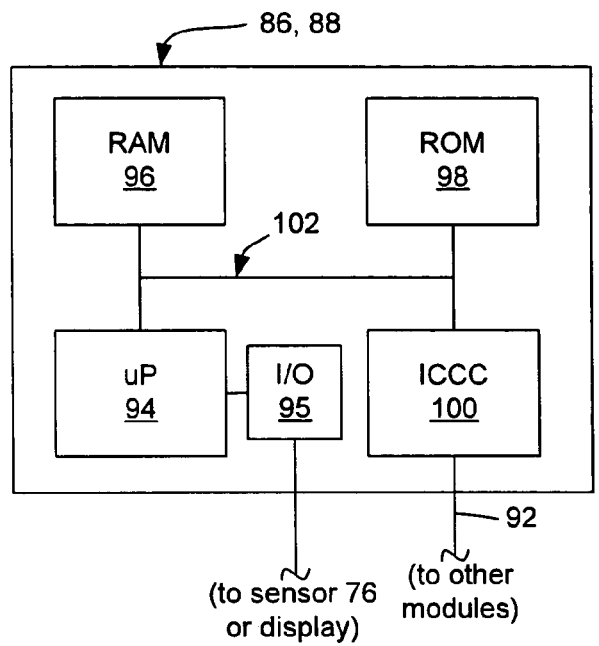
FIG. 5 is a schematic representation of two of the microcontroller modules of FIG. 4.

Referring to FIG. 5, each of modules 86 and 88 include a micro microprocessor (uP) 94 that is coupled to an I/O circuit 95, to a random access memory (RAM) 96, a read-only memory (ROM) 98, and an intra-controller communications circuit 100 over data, address and control bus 102. The ROM 98 stores programmed digital instructions that command processor 94. The RAM 96 provides memory locations that are used by the processor 94 to store various data that it generates as it executes the programmed digital instructions stored in ROM 98. Communications circuit 100 receives data in the form of digital values from processor 94 and transmits them in accordance with a predetermined communications protocol to the communications circuit of the other module in the form of digital data packets. The communications circuit is configured to provide bidirectional communications so that both modules 86 and 88 (see FIG. 4) can communicate one with the other. I/O circuit 95 preferably includes signal conditioning, analog-to-digital conversion and display driving circuitry for interfacing the modules with the outside world, and (in particular) with the sensor and the display.

The modules 86 and 88 are preferably Siemens microcontroller devices (Model No. 167) and associated circuitry. While this is the preferred embodiment, the processing described herein can be provided by any digital processor with associated RAM and ROM that is configured to receive a sensor signal and perform the steps or equivalent steps described herein. Furthermore, while the ability to communicate between two modules is desirable, one may use a single module that provides the same signal processing capability and preferably the same display-driving ability, thus obviating the need for a second module.

Figure 6:
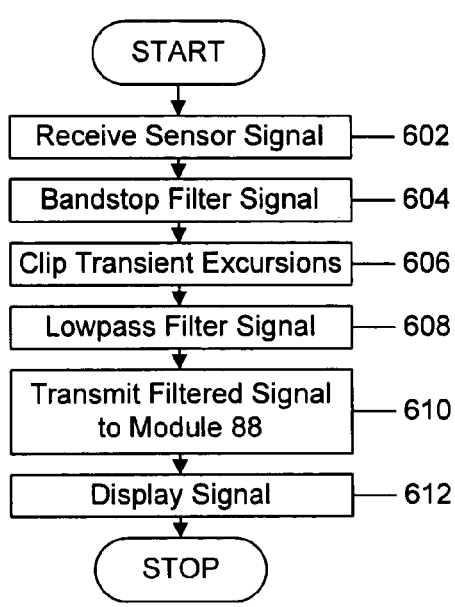
FIG. 6 is a software flow chart of the process of reading the sensor, filtering the signal and displaying the result performed by the two microcontroller modules

In operation, and as shown in FIG. 6, module 86 first receives the raw signals from sensor 76 to which it is coupled (block 602), it then notch (or band stop) filters the signal (block 604) in the first phase of noise removal. It then clips or attenuates the sudden upward excursions of the signal (block 606) caused by sudden impacts with the actuator and the actuators swinging up above the level of the tailings in the auger in the second phase of noise removal. It then smooths the results of the second phase of noise removal by low-pass filtering the results of the second phase (block 608). Finally, module 86 transmits the signal to module 88 (block 610). Once module 88 receives the signal it transmits the signal to the visual display (block 612).

Figure 7:
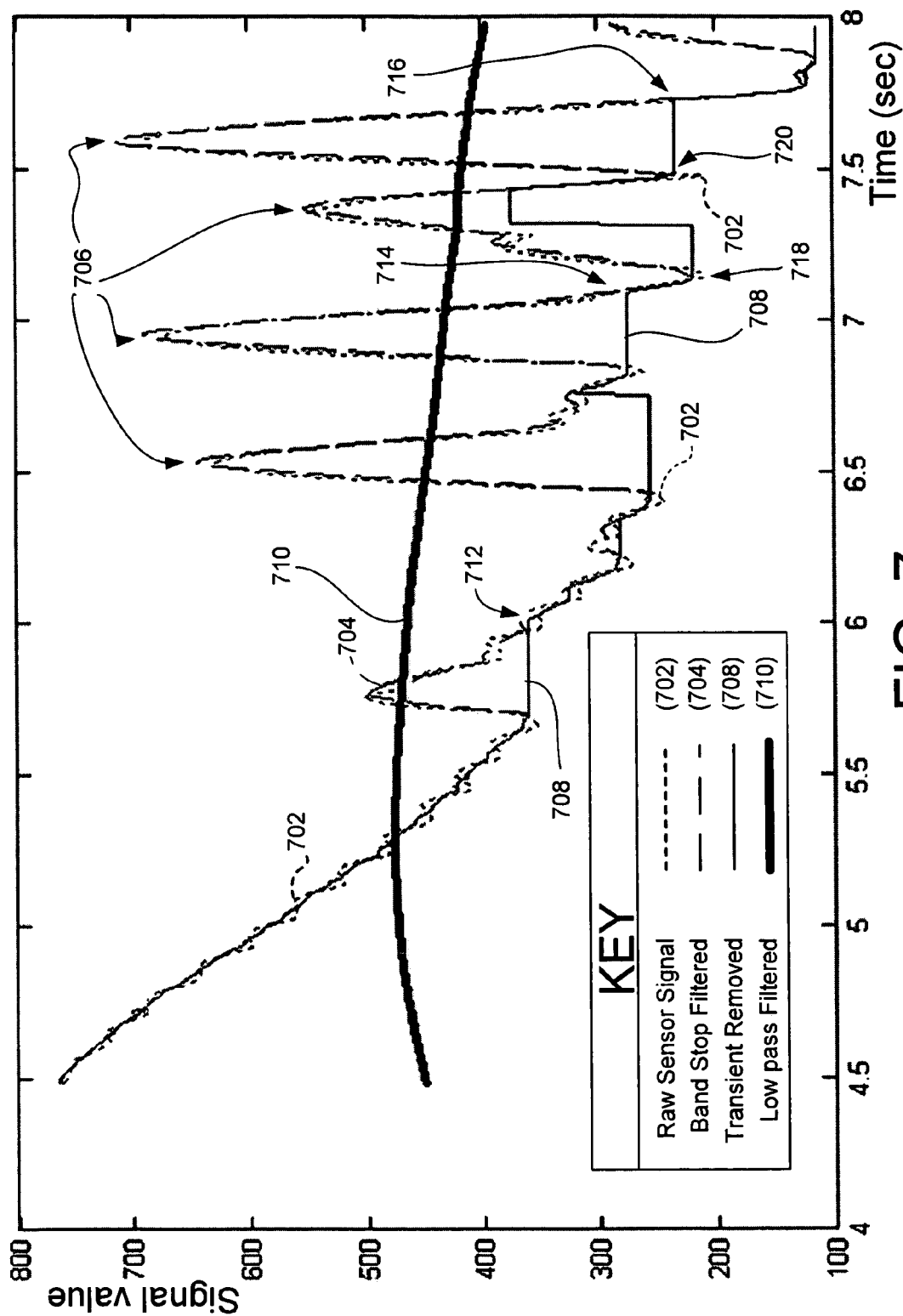
FIG. 7 is a graph of the sensor signals produced at each stage in the processing shown in FIG. 6.

These steps of noise removal and the resulting noise-reduced signal values can be seen in FIG. 7. In FIG. 7, the raw signal from the sensor is shown as first trace 702. Second trace 704 shows the same signal after it has been notch or band stop filtered to remove the 9.5 Hz noise component. Note that there are still sudden upward, positive excursions or spikes 706 in the second signal generated by sudden impacts against actuator 82 sending it bouncing up away from the flow of tailings in the auger. The third trace 708 illustrates the sensor signal after the sudden upward excursions of the signal have been removed by module 86. The final or fourth trace 710 illustrates the sensor signal after the third and final phase of noise removal—the step of low-pass filtering the results of the second phase to provide a smoothly changing, gradually rising and failing signal that most closely represents the flow of tailings through the auger of the tailings elevator.

Band Stop Filtering

In block 604, the first phase of noise removal, module 86 notch filters the raw sensor signal to remove the noise generated by the rotating auger of the tailings conveyor. The rotational speed of the auger in the preferred embodiment is 580 rpm or about 9.5 Hz. The sensor signal resonates at this frequency causing significant noise. Module 86 includes stored digital instructions that operate on the received sensor signal to remove this fluctuating noise component.

In the preferred embodiment, a Chebyshev type II band stop IIR filter is used to eliminate the resonant frequency. The filter has pass bands below 7 Hz and above 12 Hz, a stop band between 9 Hz and 10 Hz, and a sampling frequency 100 Hz. This range allows for variation in auger speed and therefore changes in the resonant frequency of the noise. In order to reduce to order of the filter, the attenuation of the stop band is selected to be 5 dB only and the pass band ripple is selected as 1 dB. These attributes will, of course, vary depending upon the magnitude of the noise signal as well as its frequency. This step may be obviated by locating sensor 76 in a different orientation and different location that reduce or eliminate the noise component generated by the auger's movement.

Transient Filtering (Clipping)

In block 606, the second phase of noise removal, module 86 removes the noise component of the signal caused by the irregular flow of tailings kicking the actuator upward above the surface of the tailings by clipping these upward-going spikes.

Figure 8:
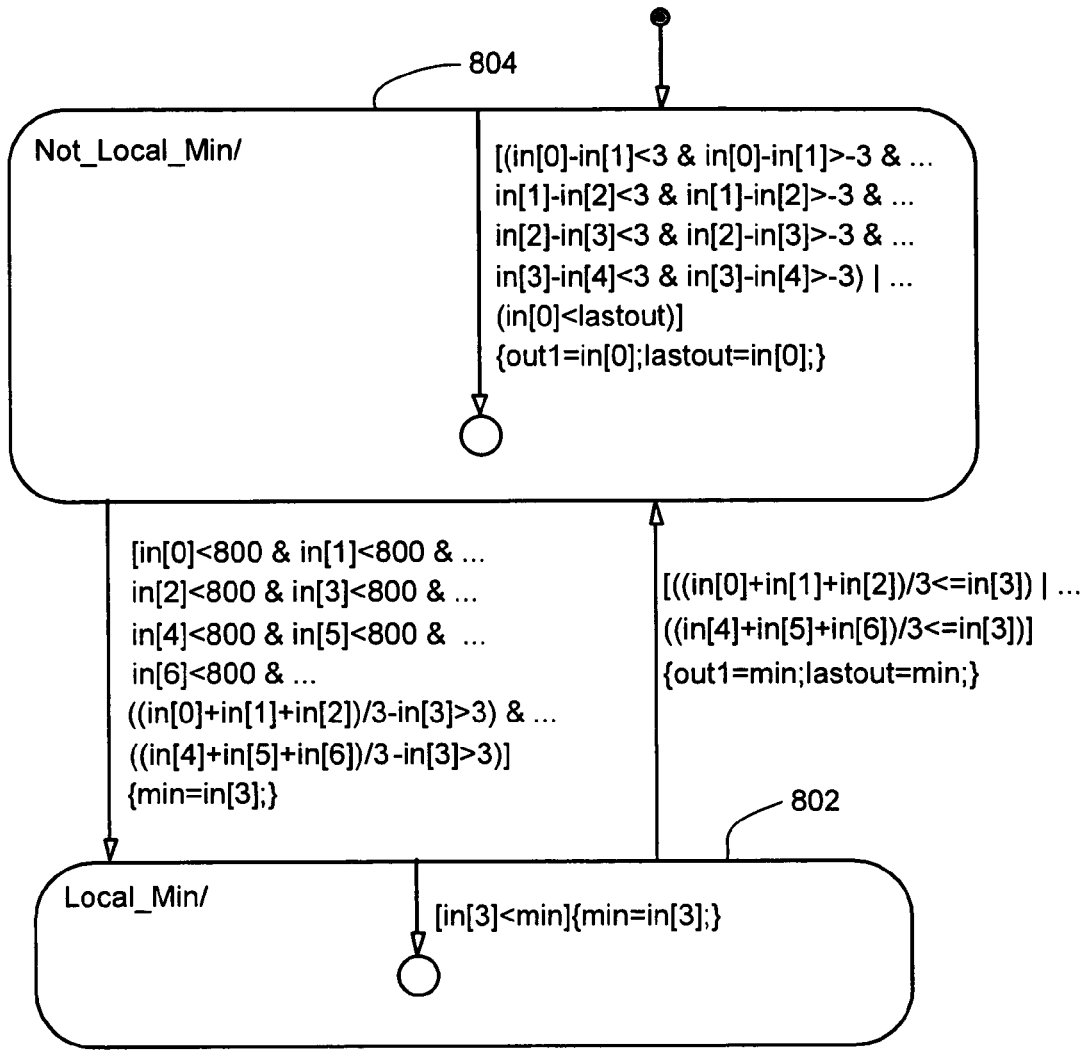
FIG. 8 is a state diagram of the second filtering step 606 of the program executed by microcontroller module 86 that performs three of the filtering steps shown in FIG. 6.

This process is illustrated in the state-transition diagram of FIG. 8 in which the first state is the "not_local_min" state, the state in which the sensor signal is not at its local minimum. One reason being the actuator 82 being forced up in the air. This is shown in FIG. 7 as the spikes or peaks in traces 702, 704. The sensor 76 signal is shown as trace 708 in FIG. 7 after these spikes or peaks have been removed.

The second state is the state of "local_min" in which the sensor signal is found to be near the bottom (i.e. the minimum) of each of the spikes in trace 704. When the signal is near its minima it is most accurate, since this is the point at which the actuator touches the top of the tailings flow, before it is again kicked up into the air by stray matter passing through the tailings elevator.

FIG. 8 illustrates the conditions that module 86 is programmed to check in each state and the actions that module 86 is programmed to take in each state to remove noise from the signal.

Before explaining the noise removal programming identified in FIG. 8, we should first explain the forms of notation that the FIGURE uses. The notation "in[x]" where "x" is a number, means the magnitude of the notch filtered signal measured at time x. In short, this refers to the y value of trace 704 that is the input to this phase of noise removal. Thus, in[0], in[1], in[2], in[3], in[4], in[5], and in[6], refer to the last seven sensor signal readings, where in[0] is the most recent and in[6] is the oldest.

In the program described below, each time a new sensor signal value is generated by module 86 (typically once every ten milliseconds) module 86 also updates each of the in[x] variables to its new value, with in[6] receiving the previous value of in[5], in[5] receiving the previous value of in[4], in[4] receiving the previous value of in[3], in[3] receiving the previous value of in[2], in[2] receiving the previous value of in[1], in[1] receiving the previous value of in[0], and in[0] receiving the very latest sensor signal value. In this manner, each of the values is simultaneously updated on a predetermined interval, preferably about every ten to one hundred milliseconds.

The state transition diagram in FIG. 8 illustrates how module 86 determines the state of the sensor 76 signal. The "state" of the signal is defined by the conditional statements associated with each state and each state transition shown in FIG. 8. The conditional statements include two parts: (1) a test of the sensor signal values, and (2) (a) a determination of the output signal, or (b) a change in the state of the system from local_minimum to not_local_minimum or vice versa.

There are only two states in the diagram, the local_minimum state 802 and the not_local_minimum state 804.

Module 86 is configured to periodically determine whether there has been a transition from the not_local_minimum state to the local_minimum state. This determination is indicated by transition Statement 1. Module 86 is programmed to execute transition statement 1 every ten milliseconds.

[in[0]<800 & in[1]<800& . . .

in[2]<800 & in[3]<800& . . .

in[4]<800 & in[5]<800& . . .

in[6]<800& . . .

$((in[0]+in[1]+in[2])/3-in[3]>3)$ & . . .

$((in[4]+in[5]+in[6])/3-in[3]>3)]$

{min=in[3];}                                        (Statement 1)

The first four lines of Statement 1 check to see if the sensor signal is in a reasonable range by insuring that the last seven sensor signal readings were less than 800. The local minimum most likely will occur well below the full range of 1024 (the full range for this particular sensor) and certainly below the 80% value of 800. For this empirically determined reason, the signal is inspected to be sure it is below 800 before it returns to the local_minimum state. Module 86 will not transition to the local_minimum state if any of the signals are equal to or greater than 800.

The fifth and sixth lines of this statement check to see if the middle reading (in[3]) of the last seven readings is a local minimum. Module 86 does this by determining whether in[3] is three less than the average of three sensor readings before it (i.e. in[4], in[5], in[6]) and also three less than the average of the three readings after it (i.e. in[0], in[1], in[2]).

If all the conditions of lines 1–6 are true, module 86 transitions to the local_minimum state and sets the value of variable "min" to the value of in[3]. At this point the variable "min" now holds module 86's best estimate of the sensor reading.

While it is in the local_minimum state, module 86 keeps track of the sensor signal to see whether it continues falling lower toward an even lower minimum as indicated by Statement 2. This statement is only executed by module 86 when module 86 is in its local_minimum state.

[in[3]<min]{min=in[3]}                              (Statement 2)

The first clause in this statement commands module 86 to check whether the fourth oldest sensor signal reading is less than the current value of "min" (i.e. in[3]<min). If so, module 86 is commanded to set the variable "min" to this now-lower value. As the signal keeps dropping in the local_minimum state, module 86 revises the local minimum ("min") downward as long as the sensor signal keeps dropping.

Ultimately the sensor signal will reach its lowest point, the point at which the sensor actuator rests on the tailings flow-passing by the sensor. It will then rise again when the actuator is hit by another clod of material, or when the tailings flow fluctuates upward.

Module 86 is configured to determine when this upward transition occurs and to change from the local_minimum state to the not_local_minimum state. Statement 3, which module 86 periodically executes while in the local-minimum state, performs this state-checking.

$[((in[0]+in[1]+in[2])/3<=in[3])|$ . . .

$((in[4]+in[5]+in[6])/3<=in[3])]$

{out1=min; lastout=min;}                            (Statement 3)

In lines 1 and 2 of this statement, module 86 checks to determine whether the average of the first three sensor signal values (in[4], in[5], in[6]) or the average of the last three sensor signal values (in[0], in[1], in[2]) are less than or equal to the values of the middle sensor signal value (in[3]). If either of these conditions exists, then at least some of the earlier or later sensor readings are lower than in[3] and therefore in[3] is no longer the minimum signal value. The signal is not at its local minimum.

If either of these conditions is true, then module 86 recognizes this fact and changes state. In line 3 of Statement 3, module 86 (1) sets the corrected sensor signal value (i.e. "out1") to the last minimum value that module 86 found, (2) exits the local_minimum state, and (3) enters the not_local_minimum state, as indicated by the state diagram of FIG. 8. Variable "out1" contains the intermediate sensor signal value after the spikes in the signal have been removed. It is shown in FIG. 7 as trace 708, which has a stair-step-like shape. Each step in the out1 trace 708 occurs whenever module 86 changes the value of "out1". These changes occur whenever module 86 transitions from the local_minimum state to the not_local_minimum state and sets "out1" equal to the latest value of "min" (see Statement 3). Stair step changes in the out1 signal may also occur while module 86 is in the not_local_minimum state and executes Statement 4.

In the not_local_minimum state, module 86 continues to monitor the sensor signal and calculate new, corrected values of the sensor signal. Statement 4 is the conditional statement executed by module 86 while it is in the not_local_minimum state.

$[(in[0]-in[1]<3$ and $in[0]-in[1]>-3$& . . .

$in[1]-in[2]<3$ and $in[1]-in[2]>-3$& . . .

$in[2]-in[3]<3$ and $in[2]-in[3]>-3$& . . .

$in[3]-in[4]<3$ and $in[3]-in[4]>-3|$ (in[0]<lastout)]

{out1=in[0];lastout=in[0];}                         (Statement 4)

In the not_local_minimum state, module continues to monitor the sensor signal to determine whether the sensor signal values are caused by actual contact with the flow of tailings or not. If either condition exists, module 86 will output the current sample, in[0], as the filtered result, out1.

The first condition (lines 1–4) is based on the assumption that only rapidly rising or rapidly falling sensor signal values result from the impact between the material and the rod. Whenever the sensor signal changes slowly, it should be considered as authentic and not noise.

To make this check, module 86 determines the rising and falling speed of the signal in lines 1–4 of Statement 4. In these lines, module 86, checks to see whether each of the last five sensor signal values (in[0], in[1], in[2], in[3], in[4]) are all within three counts of each other. If the maximum difference between adjacent sensor signal values is less than 3, then the sensor signal is stable, changing slowly, and the latest value, "in[0]", is deemed to be correct. As shown in line 6, module 86 will output the current sensor signal value, "in[0]", as the filtered sensor signal value, "out1" (out1=in[0]).

The second condition is based on observations of the simulation. Whatever value the sensor indicates, if that value is lower than the last local minimum, it is the better guess of the actual sensor signal.

In line 5, module 86 checks the latest sensor value to see if it is lower than the last output value (in[0]<lastout) and, if true, updates the output signal in line 6 (out1=in[0]). The sensor signal value, whenever smaller than the output value (out1), should be closer to the true value provided by direct contact of the actuator with the tailings flow. Therefore, the output value (out1) should be updated to the current sample value (in[0]) right away.

Trace 708 in FIG. 7 illustrates the filtering process shown in the state diagram of FIG. 8.

Referring now to FIG. 8, at times 712, 714, and 716, the sensor signal (704) drops below the previously determined output (708) and module 86 recalculates the output value, "out1", downward.

At times 718 and 720, the sensor signal (704) reaches a local minimum and begins to rise, module 86 recalculates the output value, "out1" to equal that minimum, and waits for the sensor signal to drop back down again.

These two effects are a practical illustration of how module 86 functions using the statements shown in FIG. 8.

Low-Pass Filtering

In block 608, module 86 performs the last step of sensor signal filtering. In this step, module 86 low-pass filters the stair-step-shaped output of the second filtering stage to smooth the output and provide a more gradually changing, and more realistic signal output, as indicated by the low-pass filtered signal shown in trace 710 of FIG. 7.

In block 610, module 86 is programmed to transmit the latest value of the fully filtered signal (i.e. trace 710) to module 88. In step 612, module 88 transmits the latest value to the display.

From the foregoing, it will be observed that numerous modifications and variations can be effected without departing from the true spirit and scope of the novel concept of the present invention. For example, the functions described herein as being performed by each microcontroller module may be performed by on or more than one such modules. While the modules are shown as having four basic components, they may have more or fewer, and the claimed functions may be performed by one or may be distributed among more than one. While the sensor is shown as a mechanical device, other sensors are possible, such as capacitive sensors, mass flow rate sensors, linear movement sensors, and capacitive sensors.

It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A system for sensing the presence of tailings in a combine, comprising:
    a tailings sensor disposed adjacent a laterally-extending tailings auger between adjacent sidewalls of the combine, the sensor having a sensing element and an actuator, the actuator operably associated with the sensing element, the actuator is in close proximity to the periphery of flightings on the tailings auger, the actuator configured to generate a signal indicative of a flow rate of tailings, wherein the generated signal includes a first noise component and a second noise component, the first noise component is generated from the deflection of the actuator caused by the cyclical pressure from the rotation of the tailings auger and the second noise component is generated from transient excursion noise caused by uneven flow of tailings that impact the actuator; and
    a first microcontroller module coupled to the tailings sensor and configured to receive the signal, the first microcontroller module configured to notch filter the signal to remove the first noise component from the signal and the first microcontroller module configured to further filter the signal by clipping the second noise component from the signal.

2. The system of claim 1, further comprising a second microcontroller module configured to receive the filtered signal and display it.

3. A method of sensing the presence of tailings in a combine; comprising the steps of:
    detecting a flow of tailings in a laterally-extending tailings auger with a tailings sensor that is adjacent to the tailings auger and between adjacent sidewalls of he combine;
    generating a signal indicative of the flow;
    generating a first noise component as part of the signal, the noise component indicative of the deflection of the tailings sensors caused by the pressure from the rotation of the tailings auger;
    generating a second noise component as part of the signal, the second noise component indicative of the uneven flow of tailings through the tailings auger which impact the tailings sensor;
    filtering the signal to notch filter the first noise component from the signal; and
    filtering the signal to clip the second noise component from the signal.

4. The method of claim 3, further comprising the step of displaying the filtered signal.

5. A system for sensing the presence of tailings in a combine, comprising:
    means for generating a signal indicative of a flow rate of tailings disposed adjacent to a laterally-extending tailings auger between adjacent sidewalk of the combine, the signal including a first noise component and a second noise component, the first noise component is generated from the pressure caused by the rotation of the tailings auger, the second noise component is generated from the uneven flow of tailings through the tailings auger; and
    a first microcontroller means for receiving the signal and for filtering it by notch filtering the first noise component from the signal and then clipping the second noise component from the signal.

6. The system of claim 5, further comprising a second microcontroller means for receiving the filtered signal and displaying it.

* * * * *